(12) United States Patent
Hsu et al.

(10) Patent No.: US 11,056,956 B2
(45) Date of Patent: Jul. 6, 2021

(54) DISC MOTOR

(71) Applicants: YUZEN SUSTAINABLE ENERGY CO., LTD., Taichung (TW); YUZEN (HK) SUSTAINABLE ENERGY CO., LTD., Hong Kong (CN); YUZEN SUSTAINABLE ENERGY PTE LTD., Singapore (SG)

(72) Inventors: Yung-Shun Hsu, Taichung (TW); Ming-Chun Hsu, Taichung (TW); Wen-Yu Hsu, Taichung (TW)

(73) Assignees: YUZEN SUSTAINABLE ENERGY CO., LTD., Taichung (TW); Yuzen (HK) SUSTAINABLE ENERGY CO., LTD., Hong Kong (CN); YUZEN SUSTAINABLE ENERGY PTE LTD., Singapore (SG)

( * ) Notice: Subject to any disclaimer, the term of this patent is extended or adjusted under 35 U.S.C. 154(b) by 422 days.

(21) Appl. No.: 16/074,774

(22) PCT Filed: Feb. 3, 2016

(86) PCT No.: PCT/CN2016/073257
§ 371 (c)(1),
(2) Date: Aug. 2, 2018

(87) PCT Pub. No.: WO2017/132853
PCT Pub. Date: Aug. 10, 2017

(65) Prior Publication Data
US 2019/0006924 A1 Jan. 3, 2019

(51) Int. Cl.
*H02K 17/30* (2006.01)
*H02K 21/24* (2006.01)
*H02K 29/12* (2006.01)

(52) U.S. Cl.
CPC ............. *H02K 17/30* (2013.01); *H02K 21/24* (2013.01); *H02K 29/12* (2013.01); *H02K 2201/12* (2013.01)

(58) Field of Classification Search
CPC ........ H02K 17/30; H02K 21/24; H02K 29/12; H02K 2201/12; H02K 11/20; H02K 33/16; H02K 16/00; H02P 25/032
(Continued)

(56) References Cited

U.S. PATENT DOCUMENTS 4,577,130 A * 3/1986 Reed ..................... H02K 3/47
310/194

FOREIGN PATENT DOCUMENTS

EP 2869433 * 5/2015
JP 2009071940 * 4/2009

* cited by examiner

*Primary Examiner* — Ahmed Elnakib
(74) *Attorney, Agent, or Firm* — Leong C. Lei

(57) ABSTRACT

A disc motor uses first, second magnetic components and third, fourth magnetic components of first, second magnetic disc set of a magnetic set to carry out magnetization in the motion direction, a coil of a coil set of an induction set is arranged perpendicularly to the motion direction, so as to form a four magneto-mechanical force effect; poles of the first, second magnetic components and the third, fourth magnetic component of the first, second magnetic disc sets are arranged oppositely to each other if they are different in polarity and adjacently to each other if they are the same in polarity; with the switching of forward reverse circuit power supplies of an induction switch circuit, magnetic resistant force can be avoided, the whole motion process is magnetically assisted, input power can be reduced effectively, and output power is increased.

2 Claims, 5 Drawing Sheets

(58) Field of Classification Search
USPC .......................................................... 310/112
See application file for complete search history.

DISC MOTOR

(A) TECHNICAL FIELD OF THE INVENTION

The present invention relates to a motor, and more particularly to a disc motor low in energy consumption and capable of increasing magnetic assist.

(B) DESCRIPTION OF THE PRIOR ART

Figure 1:
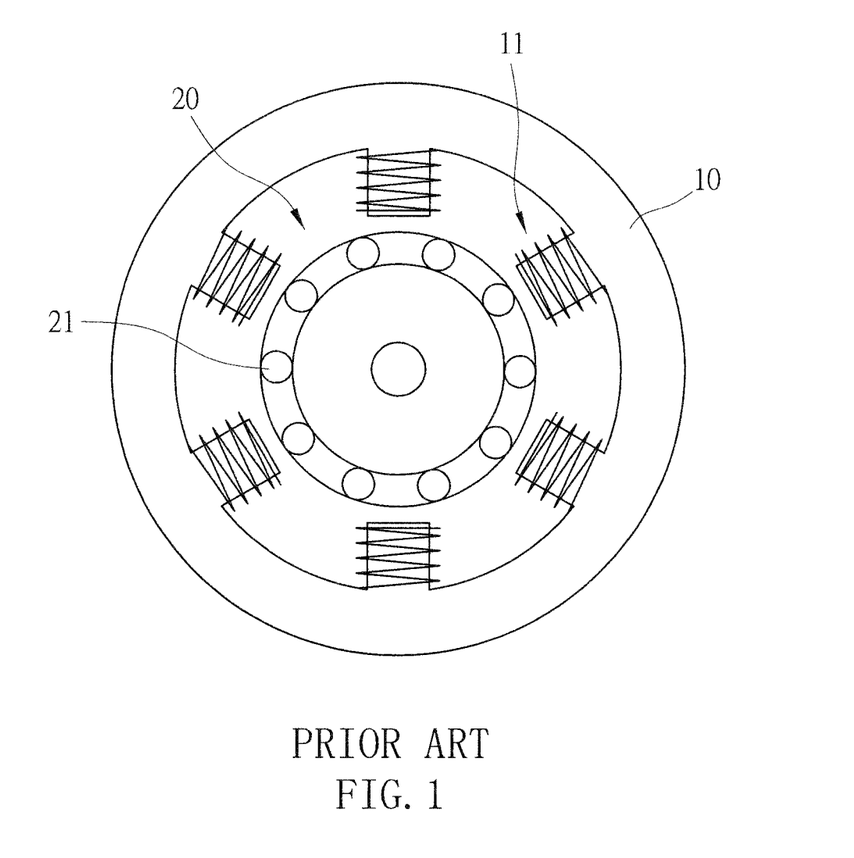
FIG. 1 is a schematic view of a conventional motor.

The structure of a general motor as shown in FIG. 1 is constituted by a stator 10 and rotor 20 of relative rotation, where the inner edge used as the stator 10 is configured with a plurality of coils 11, and the outer edge used as the rotor 20 a plurality of magnetic element 21 corresponding to the plurality of coils 11; powering the coils 11 allows them to be magnetized to generate repulsive and attractive magnetic forces with the magnetic elements 21 of the rotor 20, thereby driving the rotor 20 to be rotated in a high speed.

Upon motor operation, intermittent power supply is adopted to capture required magnetic force to drive the rotor 20 to rotate. But, the coils 11 will still be subject to the magnetic cutting of the magnetic elements 21 in inertial relative motion to generate power generation during power suspension because the coils 11 and magnetic elements 21 are configured in a high magnetic flux and high cut count way. Therefore, the existing motors need to be input higher power to suppress the internal voltage proliferated upon power generation, causing unnecessary energy waste. In addition, general motors are ring-type motors only having a single-sided single magnetic force, the output power performance of which is poor at the same power input.

In another word, to effectively reduce the amount of power generation and increase magnetic assist count can achieve low energy consumption and high output.

SUMMARY OF THE INVENTION

One object of the present invention is to provide a disc motor, capable of reducing a power proliferated voltage effectively, achieving the reduction of input power, further increasing magnetic assist so as to reduce power consumption and further to increase energy conversion efficiency and output power.

To achieve the object mentioned above, the present invention proposes a disc motor, including a magnetic set, an induction set and at least one induction switch circuit, the magnetic set and induction set being respectively defined as a rotor or stator capable of relative motion, wherein: the magnetic set comprises one layer or more layers of first magnetic disc set and one layer of more layers of second magnetic disc set, the first magnetic disc set and second magnetic disc set of the magnetic set are spaced an interval, each first magnetic disc set has at least one first magnetic component and at least one second magnetic component spaced from each other, magnetic poles on both ends of the first, second components are parallel to a motion direction, the adjacent first, second magnetic components or adjacent second, first magnetic components are kept an interval therebetween, the relative magnetic poles of the adjacent first, second magnetic components facing each other have the same polarity, each second magnetic disc set has at least one third magnetic component and at least one fourth magnetic component spaced an interval, magnetic poles on both ends of the third, fourth magnetic components are parallel to the motion direction, the adjacent third, fourth magnetic components or the fourth, third magnetic components are kept an interval therebetween, the third, fourth magnetic components of the second magnetic disc set are respectively arranged side by side with the first, second magnetic components, the third, fourth components of the second magnetic disc set and the first, second magnetic components of the first magnetic disc set are arranged side by side in different polarity, and relative magnetic poles of the adjacent third, fourth magnetic components facing each other has the same polarity; the induction set comprises at least one coil set, each coil set is configured between the relative first, second magnetic disc sets or the relative second, first magnetic disc sets, the coil set is constituted by a coil, and the coil is configured so that an extension line passed through both end magnetic poles generated after the electric conduction and magnetization thereof is perpendicular to the motion direction; the induction switch circuit is a N pole on enter ends of each first, second magnetic components of the first magnetic disc set or each third, fourth magnetic components of the second magnetic disc set of the magnetic set and configured with a forward power detector, an S pole on enter ends of each first, second magnetic components of the first magnetic disc set or each third, fourth magnetic components of the second magnetic disc set of the magnetic set and configured with a reverse power detector, and a disconnect detector is configured on leave ends of each first, second magnetic components of the first magnetic disc set or each third, fourth magnetic components of the second magnetic disc set of the magnetic set, the adjacent coil of the coil set is configured with an induction component, the induction component allows the coil to be conducted with and powered by a power supply when detecting the power detector, and vice versa, the induction component causes the coil to be disconnected from the power supply when detecting the disconnect detector.

The coil set of the induction set has a plurality of coils, and an interval between the adjacent coils is equal to the one between the enter ends of the adjacent first, second magnetic components.

With the above scheme, the disc motor of the present invention uses the first, second magnetic components and the third, fourth magnetic components of the first, second magnetic disc sets of the magnetic set to form the magnetization in the motion direction, and the coil of the coil set of the induction set is configured perpendicularly to the motion direction to form a four magneto-mechanical force effect. Furthermore, since the first, second magnetic components and the third, fourth magnetic components of the first, second magnetic disc sets are a heteropolar apposition and homopolar neighbor design, which can avoid the generation of magnetic resist with the switch of the forward, reverse circuit power supplies of the induction switch circuit, making the whole motion process magnetically assisted so that the input power can be reduced effectively and the output power can be increased. Therefore, the disc motor of the present invention can achieve a small energy consumption and larger power effect so that the present invention can increase the additional value substantially and improve the economic benefit.

DETAILED DESCRIPTION OF THE PREFERRED EMBODIMENTS

The present invention discloses a disc motor. In preferred embodiments of the present invention exemplified in the accompanying drawings and the components thereof, all concerning front and rear, left and right, top and bottom, upper and lower, and horizontal and vertical references are only used for description convenience, and do not limit the present invention and also do not limit the components thereof to any position or direction. The dimensions specified in the drawings and the specification may be varied according to the design and needs of the embodiments of the present invention without departing from the scope of the invention.

A disc motor of the present invention, as FIGS. 2 to 5 show, is constituted by a magnetic set 5, an induction set 7 and at least one inductive switch circuit 80, where the magnetic set 5 and induction set 7 may be respectively defined as a rotor or stator, where the magnetic set 5 includes at least one layer or more layers of a magnetic disc set 50 and at least one layer or more layers of a second magnetic disc set 60, and the first magnetic disc set 50 of the magnetic set 5 is spaced apart from the second magnetic disc set 60 thereof. Furthermore, the induction set 7 includes at least one coil set 70, and each coil set 70 of the induction set 7 is configured between the first magnetic disc set 50 and second magnetic disc set 60 opposite to each other and between the second disc set 60 and first magnetic disc set 50 opposite to each other; the first, second magnetic disc set 50, 60 can be rotated synchronously relatively to the coil set 70 of the induction set 7.

Figure 2:
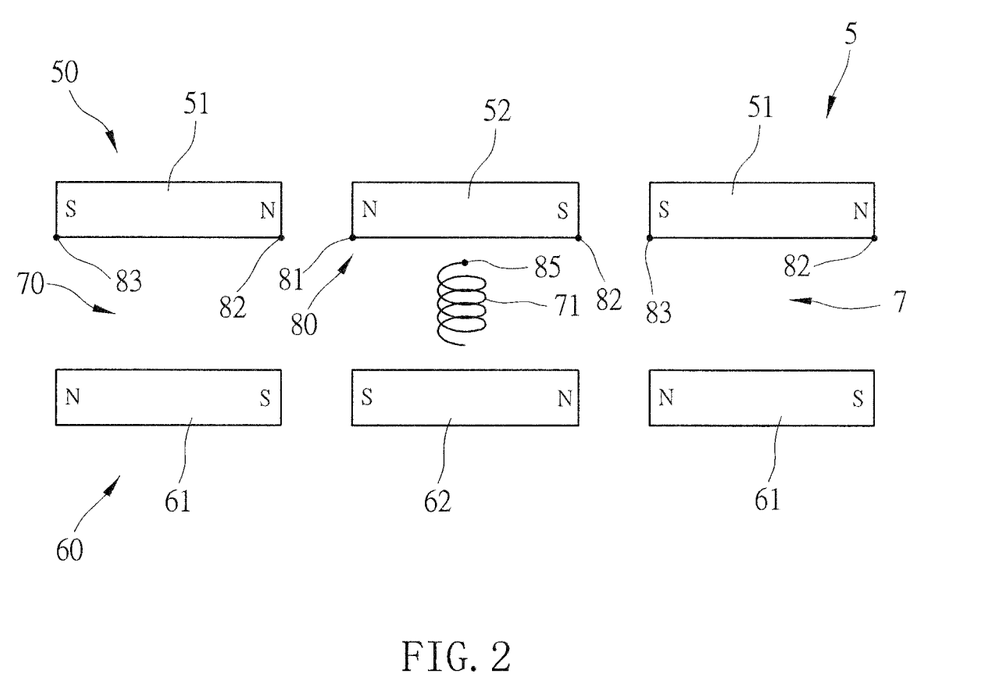
FIG. 2 is a schematic view of a preferred embodiment of a disc motor of the present invention, showing main components and the relative relationship thereof.

Referring to FIG. 2, the first magnetic disc set 50 of the magnetic set 5 has at least one first magnetic component 51 and at least one second magnetic component 52, the magnetic poles on the both ends of the first, second magnetic component 51, 52 are parallel to the motion direction, the first and second magnetic components 51, 52 are spaced apart from each other, the first and second magnetic components 51 and 52 adjacent to each other are kept an interval between them, and the magnetic poles of the adjacent first, second magnetic components 51, 52 facing to each other have the same polarity, for example, the N pole of the first magnetic component 51 corresponds to the N pole of the second magnetic component 52, and the S pole of second magnetic component 52 the S pole of the first magnetic component 51. As to the second magnetic disc set 60 of the magnetic set 5, it has at least one third magnetic component 61 and at least one fourth magnetic component 62, the magnetic poles on the both ends of the third, fourth magnetic component 61, 62 are parallel to the motion direction, the third and fourth magnetic components 61, 62 are spaced apart from each other, the third and fourth magnetic components 61 and 62 adjacent to each other are kept an interval between them. Furthermore, the third, fourth magnetic components 61, 62 of the second magnetic disc set 60 are arranged side by sided relatively with the first, second magnetic components 51, 52 of the first magnetic disc set 50, and the third, fourth magnetic components 61, 62 of the second magnetic disc set 60 are arranged in different magnetic poles with the first, second magnetic components 51, 52 of the first magnetic disc set 50, for example, the S pole of the first magnetic component 51 of the first magnetic disc set 50 is arranged side by side with the N pole of the third magnetic component 61 of the second magnetic disc set 60, and the magnetic poles of the adjacent third, fourth magnetic components 61, 62 facing to each other have the same polarity, for example, the S pole of the third magnetic component 61 corresponds to the S pole of the fourth magnetic component 62, and the N pole of the fourth magnetic component 62 the N pole of the third magnetic component 61.

The coil set 70 of the induction set 7 is constituted by at least one coil 71, where the configuration of the coil 71 allows the extension line passed through the magnetic poles on the both ends thereof generated after conduction magnetization to be perpendicular to the motion direction of the rotor.

The induction switch circuit 80 is respectively configured with a forward power detector 81 or reverse power detector 83 on one of the both ends of each of first, second magnetic components 51, 52 or each of third, fourth magnetic components 61, 62 of the first magnetic disc set 50 or second magnetic disc set 60 entering the first, second or third, fourth magnetic components 51, 52, 61, 62, where the forward power detector 81 is configured on the end of the second or third magnetic component 52, 61 where the N pole is taken to enter so as to provide forward power supply, while the reverse power detector 83 is configured on the end of the first or fourth magnetic component 51, 62 where the S pole is taken to enter so as to provide reverse power supply. Furthermore, one end leaving the first, second or third, fourth magnetic members 51, 52, 61, 62 is provided with a disconnect detector 82, and one relative end of the coil 71 of the coil set 70 of the induction set is further provided with an induction component 85 adapted to allow power to be conducted between the coil 71 and a power supply for electricity when it detects the forward power detector 81 or reverse power detector 83. Vice versa, the induction component 85 allows the power supply between the coil 71 and power supply to be disconnected when detecting the disconnect detector 82.

Whereby, the present invention assembles and constitutes a disc motor capable of reducing input power and increase output power effectively.

Figure 3A:
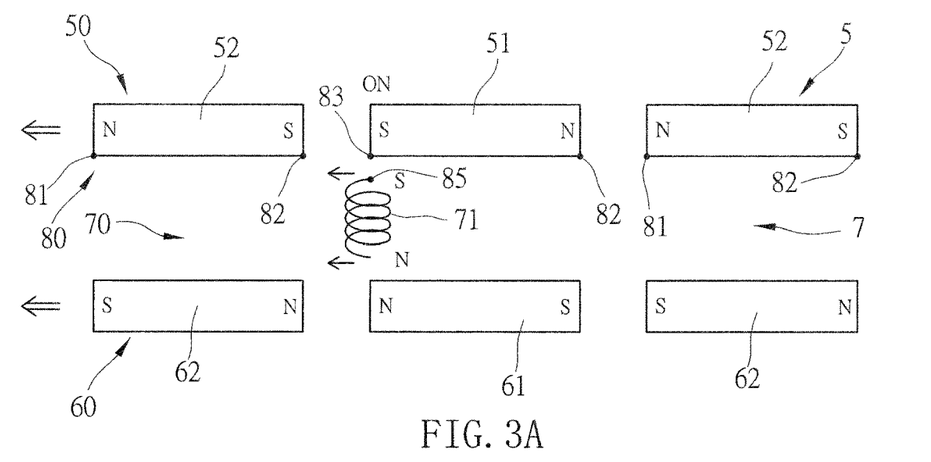
FIGS. 3A to 3C and 4A to 4C are respectively a schematic view of the motion of the embodiment of the present invention.
Figure 3B:
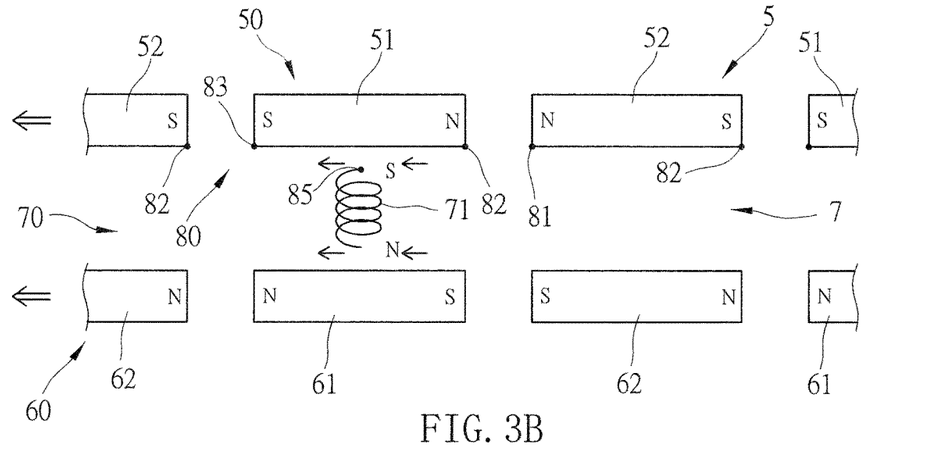
Figure 3C:
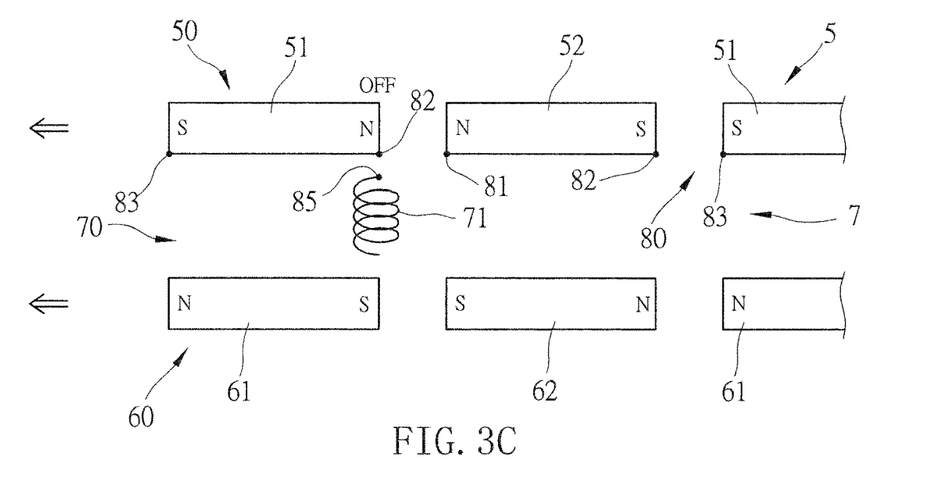

When a preferred embodiment of the disc motor of the present invention is put into practice, the magnetic set 5 is taken as a rotor, and the induction set 7 a stator for example as FIGS. 3A to 3C show. The induction component 85 on the coil 71 of the coil set 70 of the induction set 7 allows the electric conduction between the coil 71 and power supply when detecting the moving reverse power detector 83 on the entering end of the first magnetic component 51 of the first magnetic disc set 50; reverse circuit power supply is started because the entering end of the first magnetic component 51 is an S pole at this time; one end of the coil 71 corresponding to the first magnetic disc set 50 is formed an S pole, and another end thereof corresponding to the second magnetic disc set 60 is then formed a N pole according to ampere's right hand rule, allowing the both ends of the coil 71 of the coil set 70 to be respectively in the same polarity as the second, first magnetic components 52, 51 and the fourth, third magnetic components 62, 61 of the first, second magnetic disc sets 50, 60 in the front, thus causing them to repel each other and the induction set 7 to generate a repulsive force on the rotating magnetic set 5 as FIG. 3A shows. Furthermore, when the first, second magnetic disc sets 50, 60 of the magnetic set 5 are moved continuously to the positions where the coil 71 of the coil set 70 corresponds to the middle sections of the first, third magnetic components 51, 61, the both ends of the coil 71 of the coil set 70 and the poles on the front ends of the first, third magnetic components 51, 61 repel each other because of the same polarity to allow the induction set 7 to generate a continuous repulsive force on the rotating magnetic set 5, while the both ends of the coil 71 of the coil set 70 and the poles on the rear ends of the first, third magnetic components 51, 61 attract each other because of different polarity to allow the induction set 7 to generate an attraction force on the rotating magnetic set 5 as FIG. 3B shows.

When the first, second magnetic disc sets 50, 60 of the magnetic set 5 are moved continuously to the positions where the coil 71 of the coil set 70 corresponds to the rear ends of the first, third magnetic components 51, 61, the poles proliferated by the coil 71 due to reverse circuit power supply and the first, third magnetic components 51, 61 will attract each other because of different polarity, allowing the induction set 7 to generate an attraction force on the magnetic set 5, which is a magnetic resistance adapted to pull the rotating magnetic set 5 back, so that the induction component 85 causes the coil 71 to be disconnected from the power supply to avoid the generation of the magnetic resistance not conducive to the moving direction when detecting the disconnect detector 82 on the leave end of the first magnetic component 51 as FIG. 3C shows.

Figure 4A:
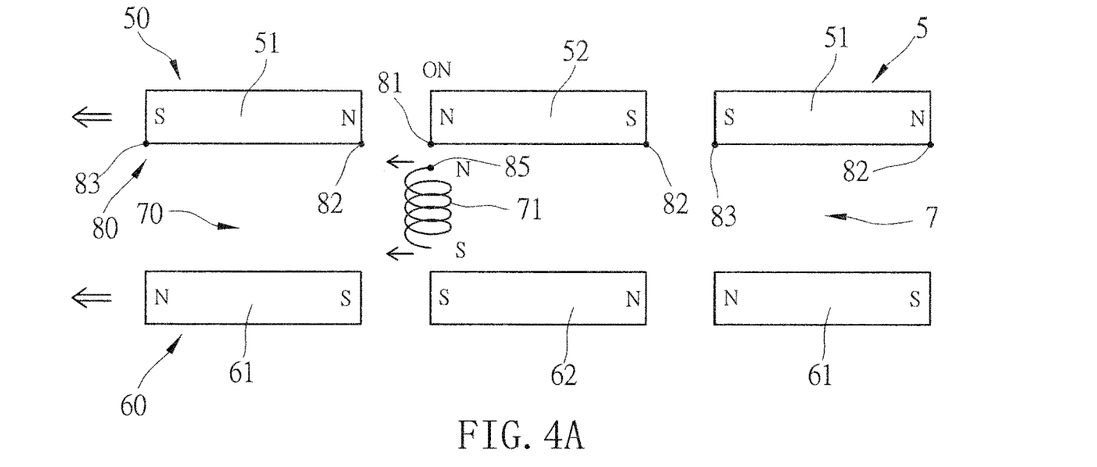
Figure 4B:
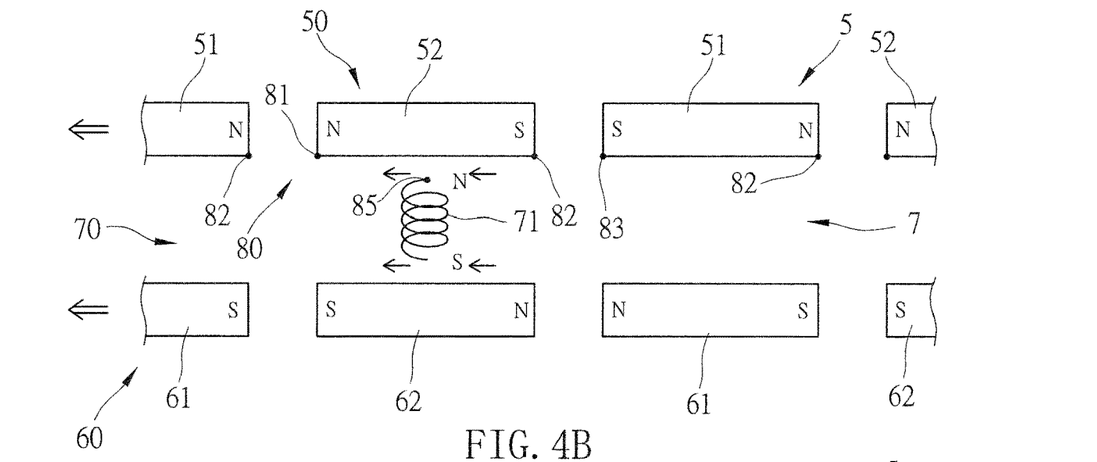
Figure 4C:
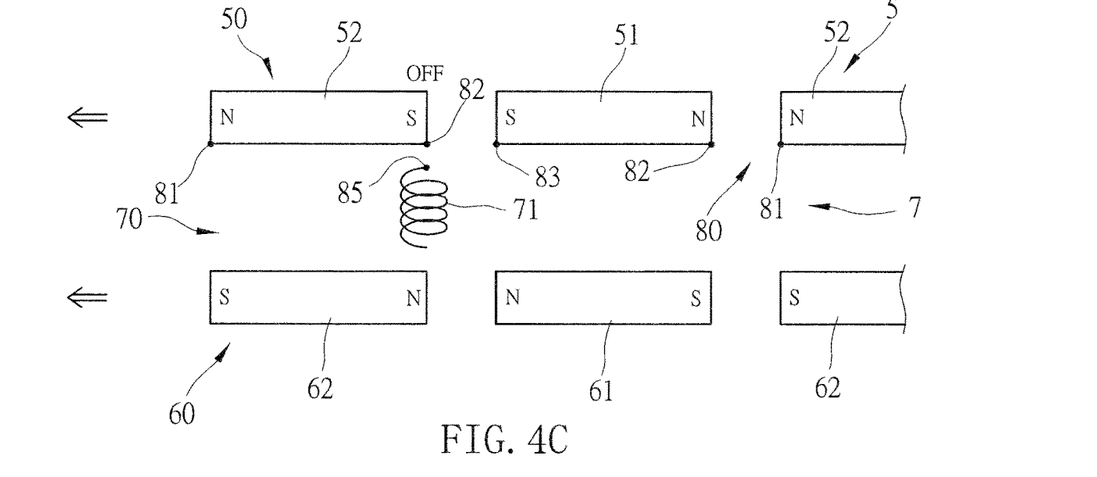

Furthermore, referring to FIGS. 4A to 4C, when the magnetic set 5 continues to operate, the induction component 85 on the coil 71 of the coil set 70 allows the coil 71 to be electrically conducted with the power supply when detecting the forward power detector 81 on the enter end of the second magnetic component 52 of the moving first magnetic disc set 50; forward circuit power supply is started because the enter end of the second magnetic component 52 is a N pole at this time; one end of the coil 71 corresponding to the first magnetic disc set 50 is formed a N pole, and another end thereof corresponding to the second magnetic disc set 60 is then formed an S pole according to ampere's right hand rule, allowing the both ends of the coil 71 of the coil set 70 to be respectively in the same polarity as the first, second magnetic components 51, 52 and the third, fourth magnetic components 61, 62 of the first, second magnetic disc sets 50, 60 in the front, thus causing them to repel each other and the induction set 7 to generate a repulsive force on the rotating magnetic set 5 as FIG. 4A shows. Furthermore, when the first, second magnetic disc sets 50, 60 of the magnetic set 5 are moved continuously to the positions where the coil 71 of the coil set 70 corresponds to the middle sections of the second, fourth magnetic components 52, 62, the both ends of the coil 71 of the coil set 70 and the poles on the front ends of the second, fourth magnetic components 52, 62 repel each other because of the same polarity to allow the induction set 7 to generate a continuous repulsive force on the rotating magnetic set 5, while the both ends of the coil 71 of the coil set 70 and the poles on the rear ends of the second, fourth magnetic components 52, 62 attract each other because of different polarity to allow the induction set 7 to generate an attraction force on the rotating magnetic set 5 as FIG. 4B shows.

When the first, second magnetic disc sets 50, 60 of the magnetic set 5 are moved continuously to the positions where the coil 71 of the coil set 70 corresponds to the rear ends of the second, fourth magnetic components 52, 62, the poles proliferated by the coil 71 due to forward circuit power supply and the second, fourth magnetic components 52, 62 will attract each other because of different polarity, allowing the induction set 7 to generate an attraction force on the magnetic set 5, which is a magnetic resistance adapted to pull the rotating magnetic set 5 back, so that the induction component 85 causes the coil 71 to be disconnected from the power supply to avoid the generation of the magnetic resistance not conducive to the moving direction when detecting the disconnect detector 82 on the leave end of the second magnetic component 52 as FIG. 4C shows.

Meanwhile, the both end magnetic poles of each relative first, third magnetic components 51, 61 and second, fourth magnetic components 52, 62 of the first, second magnetic disc sets 50, 60 are arranged in different poles, causing the magnetic lines of the relative first, third magnetic components 51, 61 and second, fourth 52, 62 to flow in the opposite direction, which makes the magnetic lines flowing through the magnetic channel between the first, second magnetic disc sets 50, 60 very few, and a large part of them flow in the magnetic gap region. At this time, it is a disconnection state such that the magnetic channel between the first, second magnetic disc sets 50, 60 is caused to be very low in power generation because of the low magnetic flux and low number of cuts, and the proliferated voltage is thus also very small. Therefore, only lower input power is needed to achieve the reduction of input power when power is given again to drive the magnetic set 5 to operate.

Figure 5:
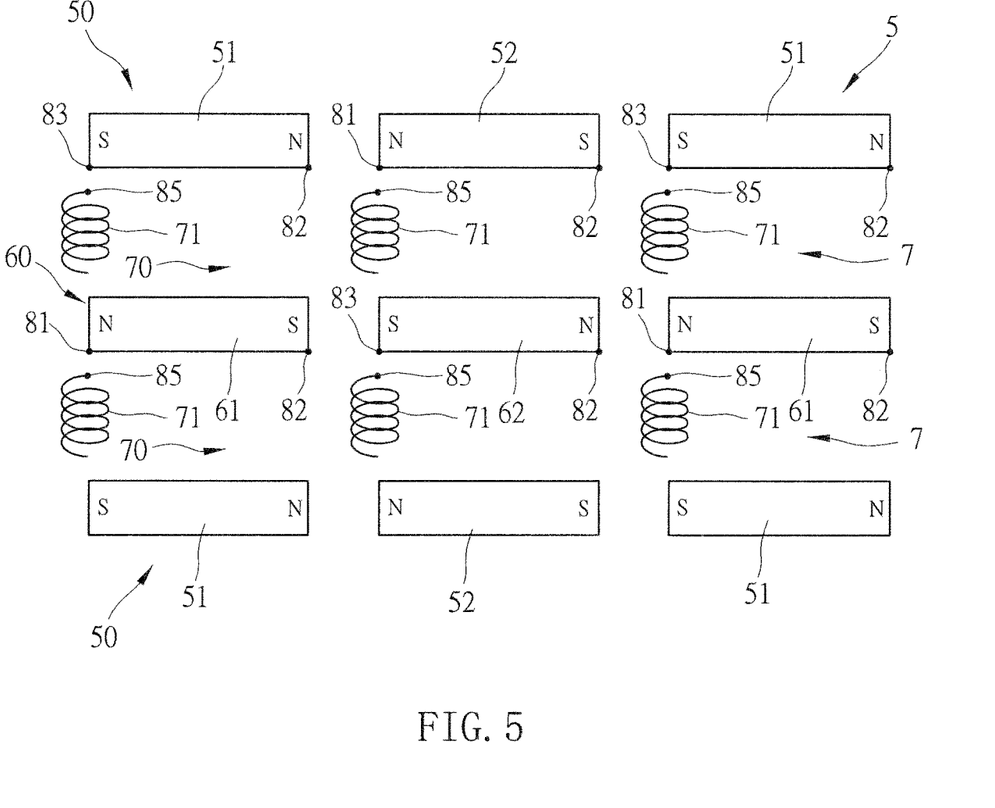
FIG. 5 is a schematic view of another preferred embodiment of the present invention, showing the relative relationship of components.

Further referring to FIG. 5, the magnetic set 5 is constituted by two layers of the first magnetic disc set 50 and one layer of the second magnetic disc set, and the induction set 7 has two layers of coil set 70, one of which is configured between the relative first magnetic disc set 50 and second magnetic disc set 60, and another of which is configured between the relative second magnetic disc set 60 and first magnetic disc set 50, where each coil set 70 has a plurality of coils 71, and the interval between the adjacent coils 71 is equal to the one between the enter ends of the adjacent first, second magnetic components 51, 52 mentioned above.

With the above structural design and action description, it can be known that the disc motor of the present invention uses the first, second magnetic components 51, 52 and the third, fourth magnetic components 61, 62 of the first, second magnetic disc sets 50, 60 of the magnetic set 5 to form the magnetization in the motion direction, and the coil 71 of the coil set 70 of the induction set 7 is configured perpendicularly to the motion direction to form a four magneto-mechanical force effect. Furthermore, since the first, second magnetic components 51, 52 and the third, fourth magnetic components 61, 62 of the first, second magnetic disc sets 50, 60 are a heteropolar apposition and homopolar neighbor design, which can avoid the generation of magnetic resist with the switch of the forward, reverse circuit power supplies of the induction switch circuit 80, making the whole motion process magnetically assisted so that the input power can be reduced effectively and the output power can be increased.

Therefore, it can be understood that the present invention is an excellent creative invention, not only solving the problems generated from the prior arts effectively but increasing the effects substantially.

We claim:

1. A disc motor, comprising a magnetic set, an induction set and at least one induction switch circuit, said magnetic set and induction set being respectively defined as a rotor or stator capable of relative motion, wherein:

said magnetic set comprises one layer or more layers of first magnetic disc set and one layer or more layers of second magnetic disc set, said first magnetic disc set and second magnetic disc set of said magnetic set are spaced an interval, each said first magnetic disc set has at least one first magnetic component and at least one second magnetic component spaced from each other, magnetic poles on both ends of said first, second components are parallel to a motion direction, said adjacent first, second magnetic components or adjacent second, first magnetic components are kept an interval therebetween, said relative magnetic poles of said adjacent first, second magnetic components facing each other have the same polarity, each second magnetic disc set has at least one third magnetic component and at least one fourth magnetic component spaced an interval, magnetic poles on both ends of said third, fourth magnetic components are parallel to said motion direction, said adjacent third, fourth magnetic components or said fourth, third magnetic components are kept an interval therebetween, said third, fourth magnetic components of said second magnetic disc set are respectively arranged side by side with said first, second magnetic components, said third, fourth components of said second magnetic disc set and said first, second magnetic components of said first magnetic disc set are arranged side by side in different polarity, and relative magnetic poles of said adjacent third, fourth magnetic components facing each other has the same polarity;

said induction set comprises at least one coil set, each said coil set is configured between said relative first, second magnetic disc sets or said relative second, first magnetic disc sets, said coil set is constituted by a coil, and said coil is configured so that an extension line passed through both end magnetic poles generated after the electric conduction and magnetization thereof is perpendicular to said motion direction;

said induction switch circuit is configured with a forward power detector arranged on an enter end of each said first, second magnetic components of said first magnetic disc set or each said third, fourth magnetic components of said second magnetic disc set of said magnetic set, which is an N pole; a reverse power detector arranged on an enter end of each said first, second magnetic components of said first magnetic disc set or each said third, fourth magnetic components of said second magnetic disc set of said magnetic set, which is an S pole; and a disconnect detector arranged on a leave end of each said first, second magnetic components of said first magnetic disc set or each said third, fourth magnetic components of said second magnetic disc set of said magnetic set, said adjacent coil of said coil set is configured with an induction component, said induction component allows said coil to be conducted with and powered by a power supply when detecting said power detector, and vice versa, said induction component causes said coil to be disconnected from said power supply when detecting said disconnect detector.

2. The disc motor according to claim 1, wherein said coil set of said induction set has a plurality of coils, and an interval between said adjacent coils is equal to the one between said enter ends of said adjacent first, second magnetic components.

* * * * *